United States Patent
Brand et al.

(10) Patent No.: US 8,634,176 B2
(45) Date of Patent: Jan. 21, 2014

(54) OVERVOLTAGE PROTECTOR

(75) Inventors: Friedrich-Eckhard Brand, Barntrup (DE); Steffen Pfoertner, Springe (DE); Bernd Pötzsch, Bad Salzuflen (DE)

(73) Assignee: Phoenix Contact GmbH Co. KG, Blomberg (DE)

( * ) Notice: Subject to any disclaimer, the term of this patent is extended or adjusted under 35 U.S.C. 154(b) by 299 days.

(21) Appl. No.: 13/144,170

(22) PCT Filed: Jan. 7, 2010

(86) PCT No.: PCT/EP2010/000041
§ 371 (c)(1),
(2), (4) Date: Jul. 12, 2011

(87) PCT Pub. No.: WO2010/079132
PCT Pub. Date: Jul. 15, 2010

(65) Prior Publication Data
US 2011/0267730 A1    Nov. 3, 2011

(30) Foreign Application Priority Data
Jan. 12, 2009 (DE) .................. 10 2009 004 673

(51) Int. Cl.
*H02H 9/04* (2006.01)
(52) U.S. Cl.
USPC ................. 361/91.2; 361/118; 361/119
(58) Field of Classification Search
USPC ............................ 361/118, 119, 91.2
See application file for complete search history.

(56) References Cited

U.S. PATENT DOCUMENTS

| | | | | |
|---|---|---|---|---|
| 5,675,640 A * | 10/1997 | Tappert et al. | ............ | 379/374.01 |
| 6,600,425 B1 | 7/2003 | Parsadayan | | |
| 7,133,300 B1 * | 11/2006 | Yang | ............ | 363/56.11 |
| 7,411,769 B2 | 8/2008 | Schimanski et al. | | |
| 7,688,562 B2 * | 3/2010 | Bowman | ............ | 361/93.6 |
| 2008/0094766 A1 | 4/2008 | Casey | | |
| 2011/0181205 A1 * | 7/2011 | Chung | ............ | 315/307 |
| 2011/0292692 A1 * | 12/2011 | Gillmor | ............ | 363/21.15 |
| 2012/0319720 A1 * | 12/2012 | Tu et al. | ............ | 324/762.08 |

FOREIGN PATENT DOCUMENTS

| | | |
|---|---|---|
| EP | 1 022 837 A2 | 7/2000 |
| EP | 1 562 272 A2 | 8/2005 |

* cited by examiner

*Primary Examiner* — Rexford Barnie
*Assistant Examiner* — Angela Brooks
(74) *Attorney, Agent, or Firm* — Roberts Mlotkowski Safran & Cole, P.C.; David S. Safran

(57) ABSTRACT

An overvoltage protector having a housing and at least one overvoltage limiter arranged in the housing, especially a gas-filled surge arrester (1), a suppressor diode (2) or a varistor. The functional ability and the state of the overvoltage protector can be controlled during operation by associating a monitoring component with the overvoltage limiter which detects a current (i) flowing over the overvoltage limiter component, and by providing an evaluation unit that evaluates the signal of the monitoring component.

6 Claims, 5 Drawing Sheets

OVERVOLTAGE PROTECTOR

BACKGROUND OF THE INVENTION

1. Field of the Invention

The invention relates to an overvoltage protector with a housing and with at least one overvoltage limiter which is located in the housing, the overvoltage limiter being especially a gas-filled surge arrester, a spark gap, a suppressor diode or a varistor.

2. Description of Related Art

Overvoltage protection can be divided into different areas of application. Here, it is distinguished between overvoltage protection for power supply, for measurement, open-loop and closed loop control (MSR) technology and for information technology and telecommunications. Interfaces of MSR technology are far more sensitive to overvoltages than power supply systems. For overvoltage protection, therefore, in the MSR domain, generally, overvoltage protectors with combined protective circuits are used, at least one overvoltage limiter being used for coarse protection and at least one overvoltage limiter being used for precision protection. Often, an indirect parallel connection of a gas-filled surge arrester and a suppressor diode is used, a decoupling resistor being located between the gas-filled surge arrester and the suppressor diode.

The known overvoltage protectors are often made as "protective plugs" which form an overvoltage protection device together with the bottom part of the device. For installation of this overvoltage protection device, there are corresponding terminals for the individual conductors on the bottom part of the device. For simple mechanical and electrical contact-making of the bottom part of the device with the respective overvoltage protector, the connecting elements in the overvoltage protector are made as plug pins for which there are corresponding sockets connected to the terminals in the bottom part of the device so that the overvoltage protector can simply be slipped onto the lower part of the device.

In these overvoltage protection devices, the installation and mounting can be done very easily in a time-saving manner due to the plug-in capacity of the overvoltage protector. In addition, these overvoltage protectors partially have a remote reporting capability, as a primary detector of the state of the overvoltage protector which is conventionally made as a changeover contact, and an optical state display in the overvoltage protector. The state display indicates whether the overvoltage limiter located in the overvoltage protector is still serviceable or not. Depending on the application of the overvoltage protector, varistors, gas-filled surge arresters, spark gasps or diodes, especially suppressor diodes, are used as overvoltage limiter.

Due to ageing, prior damage by discharge processes and intermittently occurring overvoltages (TOV) in the range of seconds, an unwanted increase of the leakage current of the varistor at operating voltages occurs, especially in overvoltage protectors with a varistor as the overvoltage limiter. Therefore, overvoltage protectors with a varistor as arrester, at present, often have a thermal disconnect device by which a varistor which is no longer reliably serviceable is electrically disconnected from the current path which is to be monitored. Moreover, thermal disconnection devices are often also used in overvoltage protectors with spark gaps as arresters.

Such an overvoltage protector is known, for example, from German Patent Application DE 20 2004 006 227 U1. In the known overvoltage protector, the state of the overvoltage limiter, especially a varistor, is monitored according to the principle of a temperature switch so that, when the varistor overheats, a solder connection provided between the varistor and a disconnector is interrupted; this leads to electrical disconnection of the varistor. Moreover, when the solder connection is interrupted a plastic element is pushed by the reset force of a spring out of a first position into a second position in which the disconnector, which is made as an elastic metal tongue, is thermally and electrically disconnected from the varistor by the plastic element. Since the plastic element has two colored markings which are located next to one another, it also acts in addition as an optical state display, as a result of which the state of the overvoltage protector can be easily read off directly on site. However only one defect of the overvoltage protector can be signaled by such an integrated display.

Since overvoltage protection devices are exposed to high peak current loads, the individual overvoltage limiters can be damaged depending on the level and frequency of the stresses so that the serviceability of the overvoltage elements should generally be monitored. To monitor the serviceability of plug-in overvoltage protectors, Phoenix Contact GmbH & Co. KG sells a portable arrester test device under the name "CHECKMASTER" (catalog TRABTECH 2007, pages 166 to 173) which has a test receiver into which the protective plug which is to be tested at the time can be plugged. In doing so, the current electrical parameters of the overvoltage limiters are determined and compared to reference values, by measuring the tolerance values highly loaded components being identified as damaged beforehand. The arrester test device thus enables—in addition to the display of a defective overvoltage protector—also a precautionary examination of an overvoltage protector. But the disadvantage is that for this purpose the overvoltage protector must be removed from the bottom part of the device so that a test is not possible during operation.

SUMMARY OF THE INVENTION

Therefore, the object of this invention is to make available a overvoltage protector of the initially described type which enables monitoring of the serviceability and of the state of the overvoltage protector during operation.

This object is achieved in the initially described overvoltage protector in that a monitoring component is assigned to the overvoltage limiter and detects a current flowing via the overvoltage limiter and that there is an evaluation unit which evaluates the signal of the monitoring component.

Because a monitoring component is assigned to the overvoltage limiter and detects a current flowing via the overvoltage limiter, especially a discharge current, detection of the stress on the overvoltage limiter in operation is possible. By using a corresponding evaluation unit which evaluates the signal which has been delivered from the monitoring component based on the current which is flowing via the overvoltage limiter, a conclusion about the loading of an overvoltage limiter is possible before a defect of the component occurs. Thus, overvoltage protectors which have been damaged beforehand can be recognized and replaced in time. The evaluation unit is preferably made such that, in addition to the frequency and the level of the loading of an overvoltage limiter, it also evaluates the duration of the loading, i.e., the duration of the discharge current.

According to one advantageous configuration of the invention, the evaluation unit is electrically isolated from the discharge current path via which the current which has been detected by the monitoring component flows. Since, when there is an overvoltage a very high, current can flow via the overvoltage limiter, especially a gas-filled surge arrester or a spark gap, the electrical isolation of the evaluation unit from the discharge current path protects the evaluation unit against damage and enables a reduction of the amplitude of the signal which is to be evaluated by the evaluation unit.

In a first preferred version of the overvoltage protector in accordance with the invention, the monitoring component is a coil which is inductively coupled to the discharge current path, the coil being connected to an integrator. By using a coil, the discharge current can be detected without the actual protective relay, i.e., the discharge current path, being influenced. By using an integrator, not only the intensity of the current pulse flowing through the coil as a result of the discharge current, but its energy are determined. From the pulse energy which has been determined in this way the loads of the overvoltage limiter, especially of a gas-filled surge arrester, can be determined and evaluated, individually or added up.

In the simplest case, the integrator can be a capacitor which is charged by the current which is flowing though the coil so that then the voltage via the capacitor is evaluated. Alternatively, the integrator can also be a microcontroller with a preferably integrated analog-digital converter.

According to a second version of the overvoltage protector in accordance with the invention, the monitoring component is a photoelement. In this version, the overvoltage limiter is a gas-filled surge arrester or a spark gap. For a gas-filled surge arrester or spark gap, when an overvoltage is present, an arc forms between the two electrodes via which the discharge current flows. The photoelement is optically connected to the gas-filled surge arrester or the spark gap such that the photoelement detects the prevailing arc. Electrical isolation between the discharge current path and the evaluation unit which is located downstream of the photoelement takes place by the photoelement.

The evaluation unit in this version of the overvoltage protector in accordance with the invention is made such that, preferably, both the intensity and also the duration of the arc can be evaluated. One advantage of this version consists especially in that, by evaluating the duration of the arc, it can be recognized if the arc is not extinguished after the actual discharge process; this results in that a line follow current unintentionally flows via the existing arc.

According to another version of the overvoltage protector in accordance with the invention, the monitoring component is an optical coupler which is connected in parallel to a resistor located in series with the overvoltage limiter and detects the current flowing through the resistor. The use of an optical coupler as a monitoring component is suitable both for overvoltage limiters which are used for coarse protection, for example, for a gas-filled surge arrester or a spark gap, and also in overvoltage limiters which are used for precision protection, for example, a suppressor diode.

If the optical coupler is used for monitoring the operation of a gas-filled surge arrester or a spark gap, the resistor which is series-connected to the overvoltage limiter and which is connected parallel to the optical coupler has the function of a shunt. The resistor thus has a relatively low value so that it does not influence the operation of the overvoltage limiter.

According to one preferred configuration of the third version in which the overvoltage protector has both a gas-filled surge arrester or a spark gap and also a suppressor diode as overvoltage limiters and in which there is a decoupling resistor between the gas-filled surge arrester or the spark gap and the suppressor diode, the optical coupler is connected parallel to the decoupling resistor. An overvoltage protector with a gas-filled surge arrester, a suppressor diode and a decoupling resistor is known from the prior art, especially in the MSR domain. To monitor the state of the suppressor diode, the optical coupler, as a monitoring component, is simply connected in parallel to the decoupling resistor which is present anyway. For high-resistance termination of the overvoltage protector, the current through the decoupling resistor corresponds to the current through the suppressor diode so that, by detecting the current through the decoupling resistor using the optical coupler, the loading of the suppressor diode is determined, and from it, a conclusion about its presumable service life can be drawn. Moreover, it can be recognized when the allowable load current flowing through the decoupling resistor is exceeded, so that damage of the resistor can be displayed and prevented.

Regardless of whether a gas-filled surge arrester or a suppressor diode is being monitored for its operation by means of the optical coupler, the electrical isolation to the evaluation unit is established by the optical coupler and converts a measured current through the discharge current path into a smaller current which can be easily measured and evaluated. It is of course also possible that for an overvoltage element with a gas-filled surge arrester or a spark gap and with a suppressor diode the serviceability of the gas-filled surge arrester is monitored by an optical coupler and the serviceability of the suppressor diode is monitored by another optical coupler.

According to an alternative version of the invention, the aforementioned object is achieved, in an overvoltage protector with a suppressor diode as the voltage limiter, in that the suppressor diode is located in the bridge branch of a diode bridge circuit and that a capacitance measurement device is connected to the suppressor diode, the capacitance measurement device detecting the capacitance or capacitance change of the suppressor diode. The capacitance measurement device can be, for example, an oscillator. The arrangement of the suppressor diode in the bridge branch of a diode bridge circuit enables measurement of the capacitance or capacitance change of the suppressor diode without the operation of the suppressor diode as an overvoltage limiter being influenced. The change of the capacitance of the suppressor diode is an indication of a change of the suppressor diode and thus of completed loading of the suppressor diode.

Advantageously, the four diodes of the diode bridge circuit each have a much lower capacitance than the suppressor diode. In this way, the total capacitance of the diode bridge circuit is reduced, as a result of which a higher maximum signal frequency of the connected circuit is enabled.

According to one configuration of the overvoltage protector in accordance with the invention which is advantageously implemented both in the first alternative and also the second alternative, there is at least one optical state display for at least one overvoltage limiter in the housing so that the state of the overvoltage protector or of an overvoltage limiter can be displayed directly on site. The state display can preferably have three regions with different markings, especially three regions with different colors, for example, green, yellow and red, so that not only the defect of an overvoltage limiter, but prior damage can be displayed. If the overvoltage protector has several overvoltage limiters, for each limiter, its state can be separately displayed.

According to another advantageous configuration of the invention, the overvoltage protector in addition to the optical state display also has a telecommunications contact for remote indication of the state of the overvoltage protector or of the states of the individual overvoltage limiters.

In particular, there are now a host of possibilities for embodying and developing the overvoltage protector in accordance with the invention. In this regard reference is made the following description of preferred exemplary embodiments in conjunction with the accompanying drawings.

DETAILED DESCRIPTION OF THE INVENTION

Figure 1:
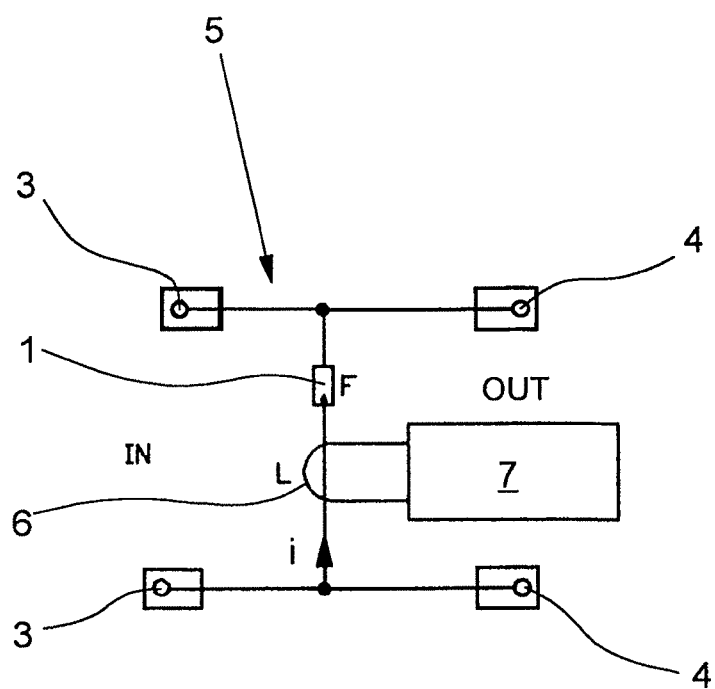
FIG. 1 shows a simplified circuit diagram of a first version of an overvoltage protector in accordance with the invention.
Figure 2:
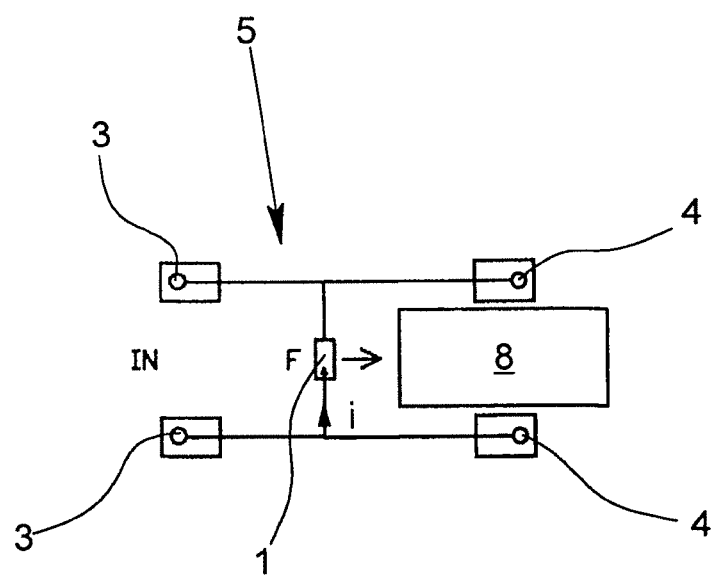
FIG. 2 shows a simplified circuit diagram of a second version of an overvoltage protector in accordance with the invention.
Figure 3:
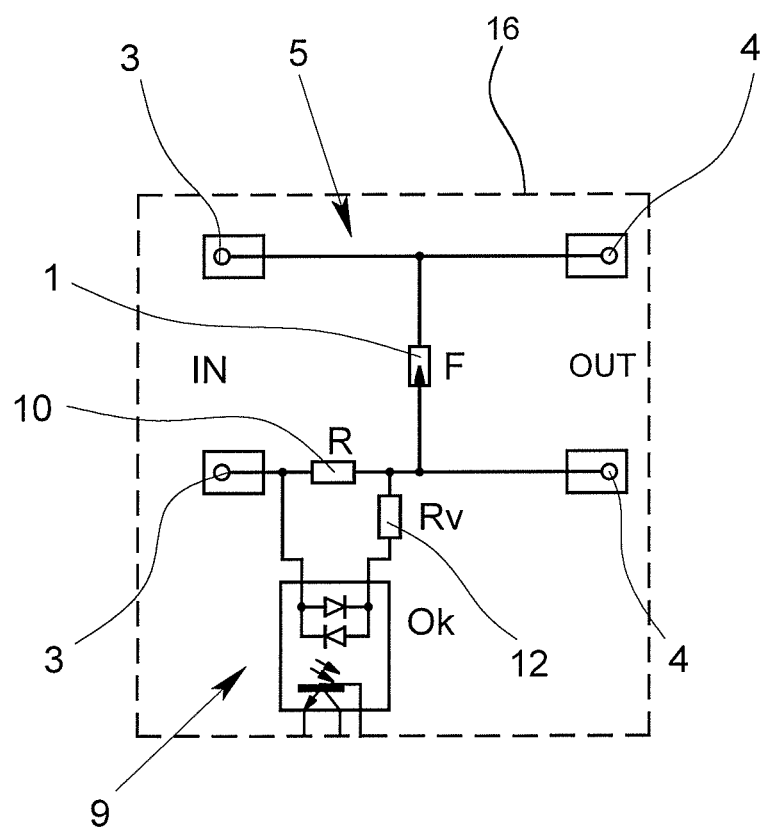
FIG. 3 shows a simplified circuit diagram of a third version of an overvoltage protector in accordance with the invention.

The figures each show a simplified circuit diagram of a respective version of the overvoltage protector in accordance with the invention. In the circuit diagrams, only the overvoltage limiter or limiters and a monitoring component are shown. FIGS. 1 to 3 each show an exemplary embodiment in which the overvoltage limiter is a gas-filled surge arrester 1. In the exemplary embodiments according to FIGS. 4 and 5, in addition to a gas-filled surge arrester 1 for coarse protection, there is also a suppressor diode 2 for precision protection. The simplified circuits shown in the figures have two input terminals 3 for connection of two lines and two output terminals 4 for connection of the device to be protected, for example, a sensor or a control. There can be other terminals, especially a ground terminal, even if they are not shown in the figures.

It is common to the exemplary embodiments according to FIGS. 1 to 4 that a monitoring component is assigned to the gas-filled surge arrester 1 (FIGS. 1 to 3) or the suppressor diode 2 (FIG. 4) which detects a current i flowing via the gas-filled surge arrester 1 or the suppressor diode 2. The signal which is generated depending on the current i from the monitoring component is evaluated in an evaluation unit (not shown here), the evaluation unit in the exemplary embodiments according to FIGS. 1 to 4 being electrically isolated from the discharge current path 5 via which the current i flows through the gas-filled surge arrester 1 or the suppressor diode 2.

In the exemplary embodiment according to FIG. 1, the monitoring component is a coil 6 which is inductively coupled to the discharge path 5 so that a current i from the coil 6 is detected by the gas-filled surge arrester 1. The coil 6 is connected to an integrator 7, as a result of which the energy of the current pulse can be determined by the gas-filled surge arrester 1. The loading of the gas-filled surge arrester 1 by the discharge current i can be determined from the pulse energy.

In the exemplary embodiment according to FIG. 2, a photoelement 8 is used as a monitoring component, the photoelement 8 being located adjacent to the gas-filled surge arrester 1 such that an arc which prevails in the gas-filled surge arrester 1 when an overvoltage is present is detected by the photoelement 8. Suitable signal processing makes it possible to determine the intensity and the duration of the discharge process using the arc which has been detected by the photoelement 8, and thus, provides a measure of the loading of the gas-filled surge arrester 1.

Figure 4:
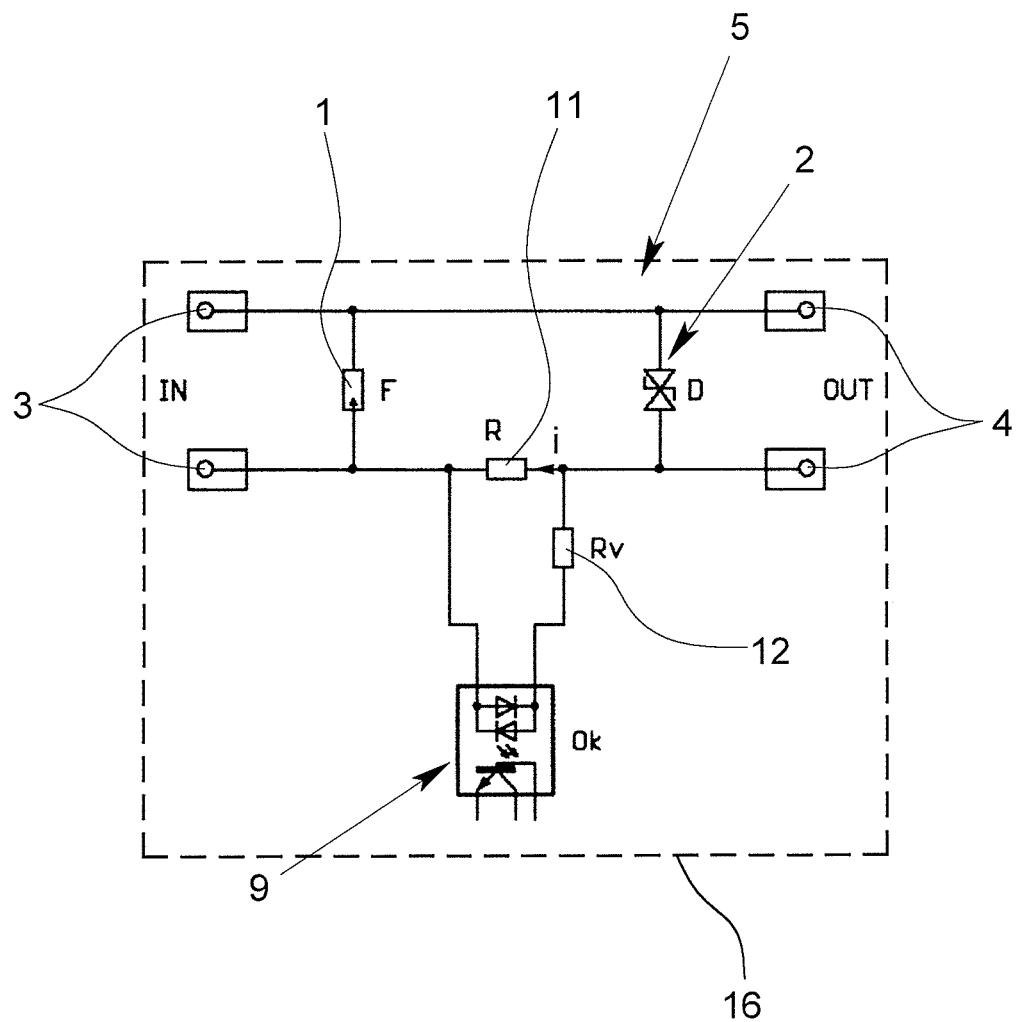
FIG. 4 shows a simplified circuit diagram of a fourth version of an overvoltage protector in accordance with the invention.

In the two embodiments according to FIGS. 3 and 4, the monitoring component is an optical coupler 9, the optical coupler 9 in the version according to FIG. 3 being parallel to a resistor 10 which is in series with the gas-filled surge arrester 1. While in the exemplary embodiment according to FIG. 3 the serviceability of the gas-filled surge arrester 1 is monitored with the optical coupler 9, the optical coupler 9 in the exemplary embodiment according to FIG. 4 is used for monitoring of the suppressor diode 2. For this purpose, the optical coupler 9 is connected in parallel to a decoupling resistor 11 which is located between the gas-filled surge arrester 1 and the suppressor diode 2.

In the current path of the optical coupler 9, there is another resistor 12 whose resistance value is much larger than the resistance value of the resistor 10 or of the decoupling resistor 11. In the exemplary embodiment according to FIG. 4, the decoupling resistor 11 is in the range of a few ohms while the resistor 12 is, for example, in the range of a few hundred ohms.

The optical coupler 9 is used to detect the current flowing through the resistor 10 or the decoupling resistor 11, with the optical coupler 9 or a downstream evaluation unit both the amplitude and also the duration of a current pulse i being detected which is flowing through the resistor 10 or the decoupling resistor 11, and thus, for a high-resistance termination also through the gas-filled surge arrester 1 and the suppressor diode 2.

Figure 5:
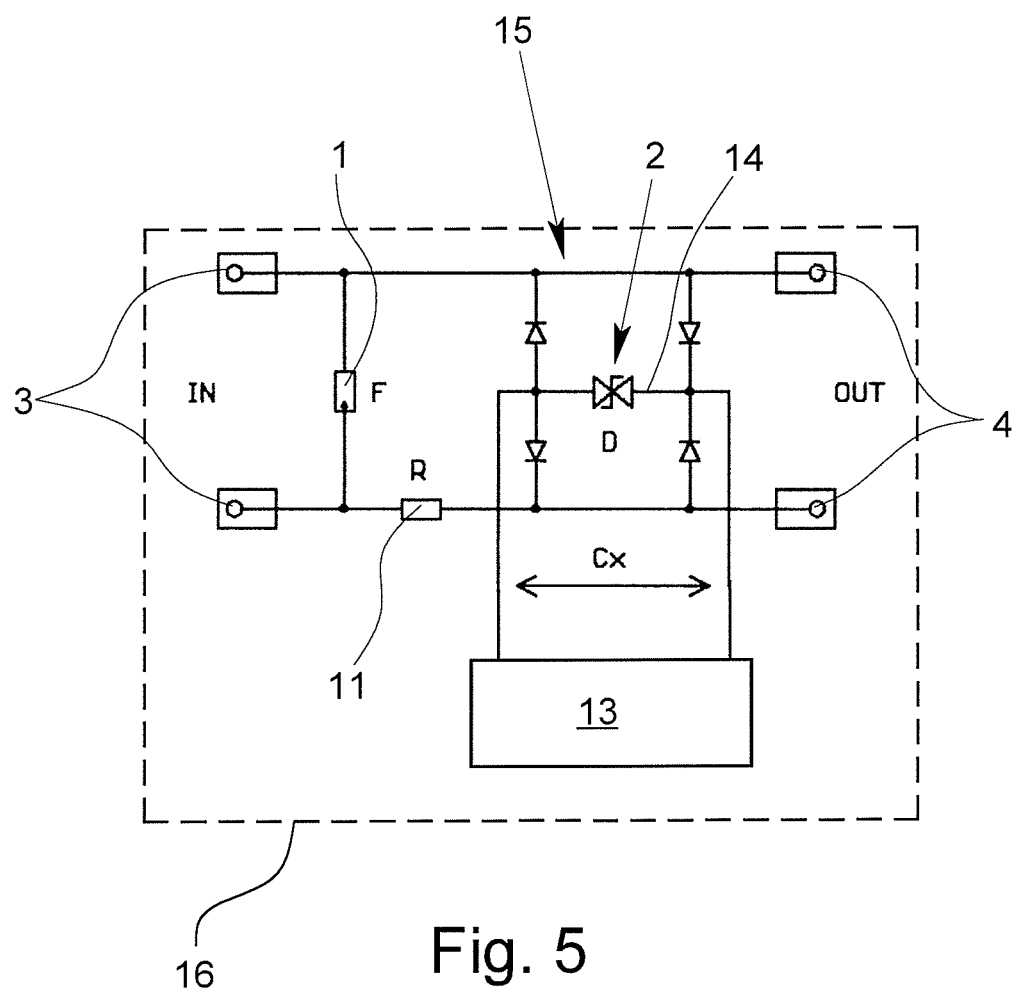
FIG. 5 shows a simplified circuit diagram of another version of an overvoltage protector in accordance with the invention.

FIG. 5 shows a version of an overvoltage protector with a gas-filled surge arrester 1 and a suppressor diode 2 in which the state of the suppressor diode 2 is checked by the capacitance $C_x$ and a capacitance change of the suppressor diode 2 is detected, for which a capacitance measurement device 13, for example, an oscillator and/or a microcontroller, is connected to the suppressor diode 2. As is apparent from FIG. 5, the suppressor diode 2 is in the bridge branch 14 of a diode bridge circuit 15 which has four diodes, as a result of which the capacitance $C_x$ can be measured without the operation of the suppressor diode 2 as an overvoltage limiter, specifically as precision protection of the overvoltage protector, being influenced. The individual diodes of the diode bridge circuit 15 have a much smaller capacitance than the suppressor diode 2.

Even if, in FIGS. 1 to 5, there is only one monitoring component for monitoring the serviceability of a respective overvoltage limiter, it is apparent to one skilled in the art that, to monitor several overvoltage limiters, there can also be several identical or different monitoring components.

Thus, for example, in an overvoltage protector according to FIG. 4 which has both a gas-filled surge arrester 1 and also a suppressor diode 2, the serviceability of the gas-filled surge arrester 1 is monitored by means of a first optical coupler 9 and the serviceability of the suppressor diode 2 is monitored by means of a second optical coupler 9. It is likewise also possible, for example, to monitor the serviceability of the gas-filled surge arrester 1 with a coil 6 according to FIG. 1 or with a photoelement 8 according to FIG. 2 in the overvoltage protectors shown in FIGS. 4 and 5.

What is claimed is:

1. Overvoltage protector with a housing and with at least one overvoltage limiter located in the housing, wherein:
    a monitoring component is assigned to the overvoltage limiter and detects a current (i) flowing via the overvoltage limiter,
    the monitoring component is an optical coupler which is connected in parallel to a resistor that is located in series with the overvoltage limiter, the monitoring component being operative for detecting current flowing through the resistor, and
    an evaluation unit is provided which is adapted for evaluating a signal of the monitoring component, the evaluation unit being electrically isolated from a discharge current path via which the current (i) detected by the monitoring component flows.

2. Overvoltage protector as claimed in claim 1, wherein a resistor is located in series with the overvoltage limiter, wherein another resistor is connected to the optical coupler in series, and wherein the resistor connected to the optical coupler in series has a resistance value that is greater than the resistance value of the resistor which is located in series with the overvoltage limiter.

3. Overvoltage protector as claimed in claim 1, wherein the overvoltage limiter is one of a gas-filled surge arrester, a spark gap, a suppressor diode, and a varistor.

4. Overvoltage protector as claimed in claim 1, wherein the overvoltage limiter comprises both a suppressor diode and one of a spark gap and a surge arrestor, and wherein a decoupling resistor is located between the suppressor diode and said one of a spark gap and a surge arrestor, the optical coupler being located in parallel to the decoupling resistor.

5. Overvoltage protector as claimed in claim 1, wherein an optical state display for at least one overvoltage limiter is located in the housing.

6. Overvoltage protector as claimed in claim 1, wherein a telecommunications contact for remote indication of the state of at least one overvoltage limiter is located in the housing.

\* \* \* \* \*